US012374794B2

(12) United States Patent
Chiang et al.

(10) Patent No.: US 12,374,794 B2
(45) Date of Patent: Jul. 29, 2025

(54) ANTENNA-IN-PACKAGE CONSTRUCTION WITH FREQUENCY DIVISION DUPLEX TECHNOLOGY

(71) Applicant: INDUSTRIAL TECHNOLOGY RESEARCH INSTITUTE, Hsinchu (TW)

(72) Inventors: Ching-Wen Chiang, Hsinchu (TW); Huan-Ta Chen, Baoshan Township (TW); Chung-Lien Ho, Zhubei (TW); Chin Pin Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 191 days.

(21) Appl. No.: 18/468,779

(22) Filed: Sep. 18, 2023

(65) Prior Publication Data

US 2025/0055190 A1 Feb. 13, 2025

(30) Foreign Application Priority Data

Aug. 8, 2023 (TW) ................................ 112129752

(51) Int. Cl.
*H01Q 5/40* (2015.01)
*H01Q 1/22* (2006.01)

(52) U.S. Cl.
CPC ............ *H01Q 5/40* (2015.01); *H01Q 1/2283* (2013.01)

(58) Field of Classification Search
CPC .......... H01Q 5/40; H01Q 1/2283; H01Q 1/24; H01Q 1/38; H01Q 5/42; H01Q 21/065
See application file for complete search history.

(56) References Cited

U.S. PATENT DOCUMENTS

| | | | |
|---|---|---|---|
| 6,211,841 | B1 | 4/2001 | Smith et al. |
| 10,505,255 | B2 | 12/2019 | Baheti et al. |

(Continued)

FOREIGN PATENT DOCUMENTS

| | | |
|---|---|---|
| CN | 113270395 A | 8/2021 |
| CN | 115458954 A | 12/2022 |

(Continued)

OTHER PUBLICATIONS

Amendola et al."Low-Earth Orbit User Segment in the Ku and Ka-Band: An Overview of Antennas and RF Front-End Technologies", EEE Microwave Magazine, Jan. 2, 2023, pp. 32-48.

(Continued)

*Primary Examiner* — Seung H Lee
(74) *Attorney, Agent, or Firm* — Birch, Stewart, Kolasch & Birch, LLP

(57) ABSTRACT

An antenna-in-package construction includes a chip layer, a second dielectric layer, and a first dielectric layer stacked in order. The first dielectric layer has a dielectric constant more than 3.5. The antenna-in-package construction includes a transmitting antenna array, a receiving antenna array, and metal isolated pillars. The transmitting antenna array extends from the chip layer to the first dielectric layer through the second dielectric layer. The receiving antenna array extends from the chip layer to the second dielectric layer. The transmitting antenna array and the receiving antenna array are arranged in an alternating interleaved sequence. The metal isolated pillars surround each transmitting antenna and each receiving antenna. The chip layer includes at least one transmitting chip and at least one receiving chip. The transmitting chip and the receiving chip are electrically connected to the transmitting antenna array and the receiving antenna array, respectively.

20 Claims, 8 Drawing Sheets

(56) References Cited

U.S. PATENT DOCUMENTS

| | | | |
|---|---|---|---|
| 10,892,561 B2 | 1/2021 | Lin et al. | |
| 11,050,155 B2* | 6/2021 | Eid | H01L 23/3107 |
| 11,128,030 B2* | 9/2021 | Kim | H01L 23/5383 |
| 11,217,543 B2 | 1/2022 | Kim et al. | |
| 11,569,562 B2 | 1/2023 | Wang et al. | |
| 2016/0182204 A1 | 6/2016 | Hsieh | |
| 2018/0159203 A1 | 6/2018 | Baks et al. | |
| 2018/0241122 A1 | 8/2018 | Jalali Mazlouman et al. | |
| 2018/0316098 A1 | 11/2018 | Amadjikpe | |
| 2019/0081414 A1 | 3/2019 | Kao et al. | |
| 2020/0035625 A1* | 1/2020 | Wang | H01L 23/552 |
| 2020/0052404 A1 | 2/2020 | Eid et al. | |
| 2020/0185299 A1 | 6/2020 | Chang et al. | |
| 2021/0242116 A1 | 8/2021 | Scuderi et al. | |
| 2022/0006486 A1 | 1/2022 | Rajagopalan et al. | |
| 2022/0209391 A1* | 6/2022 | Tang | H01L 23/4334 |
| 2023/0062464 A1 | 3/2023 | Kim et al. | |
| 2025/0038412 A1* | 1/2025 | Liu | H01L 25/165 |

FOREIGN PATENT DOCUMENTS

| | | | |
|---|---|---|---|
| TW | I700802 B | 8/2020 | |
| TW | I715171 B | 1/2021 | |
| TW | I722776 B | 3/2021 | |
| TW | 202131554 A | 8/2021 | |
| TW | I777534 B | 9/2022 | |
| TW | M637071 U | 2/2023 | |
| WO | WO-2021262369 A1 * | 12/2021 | H01Q 1/2283 |

OTHER PUBLICATIONS

Chiang et al., "A 3-D Pillar-Based Electromagnetic Interference Shield for W-Band Antenna on Silicon Using Wire Bonding Technology," IEEE Transactions on Components, Packaging and Manufacturing Technology, Dec. 2021 Vol. 11, No. 12, pp. 2238-2241.

Gu et al., "An Enhanced 64-Element Dual-Polarization Antenna Array Package for W-band Communication and Imaging Applications," 2018 IEEE 68th Electronic Components and Technology Conference (ECTC), San Diego, CA, USA, 2018, pp. 197-201.

Low et al., "A 17.7-20.2-GHz 1024-Element K-Band SATCOM Phased-Array Receiver With 8.1-dB/K G/T, ±70° Beam Scanning, and High Transmit Isolation", IEEE Transactions on Microwave Theory and Techniques, Mar. 2022, vol. 70, No. 3, pp. 1769-1778.

Low et al.,"A 27-31-GHz 1024-Element Ka-Band SATCOM Phased-Array Transmitter With 49.5-dBW Peak EIRP, 1-dB AR, and ±70° Beam Scanning", IEEE Transactions on Microwave Theory and Techniques, Mar. 2022, vol. 70, No. 3, pp. 1757-1768.

Shively et al., "Wideband Planar Arrays with Variable Element Sizes," Digest on Antennas and Propagation Society International Symposium, San Jose, CA, USA, 1989, vol. 1, pp. 155-157.

Wang et al., "An Overview of Enhanced Massive MIMO With Array Signal Processing Techniques", IEEE Journal of Selected Topics in Signal Processing, Sep. 2019, vol. 13, No. 5, pp. 886-901.

Taiwanese Office Action and Search Report for Taiwanese Application No. 112129752, dated Jun. 11, 2024.

Extended European Search Report for European Application No. 23203470.2, dated Mar. 12, 2024.

* cited by examiner

ANTENNA-IN-PACKAGE CONSTRUCTION WITH FREQUENCY DIVISION DUPLEX TECHNOLOGY

CROSS REFERENCE TO RELATED APPLICATION

This Application claims priority of Taiwan Patent Application No. 112129752, filed on Aug. 8, 2023, the entirety of which is incorporated by reference herein.

TECHNICAL FIELD

The disclosure relates to an antenna-in-package construction, and in particular, relates to an antenna-in-package construction that includes a transmitting antenna array and a receiving antenna array arranged in an alternating interleaved sequence on the same plane, which can simultaneously transmit uplink signals and receive downlink signals in different frequency bands.

BACKGROUND

With the development of 5G communication technology, it is anticipated that future trends will lead to a 6G communication technology. Recently, phased array antennas have been applied to satellite communications, particularly low-Earth orbit (LEO) satellite communications. Technically, LEO satellite communications can address the challenges faced in mobile communications, wherein radio frequency (RF) signals cannot cover rugged terrain. Moreover, from a business perspective, companies like Starlink and Amazon in the West have already launched satellites into low-Earth orbit, aiming to establish communications between ground-based transceivers and LEO satellites. This shows that the global market for ground communication equipment for LEO satellites is booming.

A phased array antenna consists of multiple antennas combined with communication devices that control their phases. By adjusting the phase of each individual antenna, beams can be directed in specific orientations at different times and in different spatial regions. For example, a high-directivity array 32×32 antenna has a gain that is greater than 30 dBi and a beam width of less than 3.5°. The space between adjacent antennas can range from a half-wave length (λ/2) to a quarter-wave length (λ/4), with the preferred space being a half-wave length (λ/2). Additionally, these high-directivity array antennas also exhibit minimal point errors and reduced grating lobes.

In reality, when a transceiver transmits RF signals (also referred to as uplink signals), it operates at frequencies from 27.5 GHz to 30 GHz. However, when the transceiver receives RF signals (also referred to as downlink signals), it operates from 17.7 GHz to 20.2 GHz. If a transceiver transmits and receives uplink and downlink signals in different frequency bands simultaneously, the uplink signal and the downlink signal may interfere with each other between the phase-array antenna at the transmitting end (also referred to as transmitting array antenna) and the phase-array antenna at the receiving end (also referred to as receiving array antenna). Moreover, with antenna-in-package construction, the space between transmitting array antennas is 5.36 mm, whereas the space between receiving array antennas is 8.33 mm. This results in the space between a transmitting antenna and the adjacent receiving antenna not adhering to the optimal ratio of $$\frac{1}{\sqrt{2}}.$$

To resolve the interference between uplink and downlink signals, a common solution is to arrange transmitting array antennas and receiving array antennas in a staggered arrangement. However, in this arrangement, because the area of the transmitting array antenna is smaller than the area of the receiving array antenna, the transmitting array antenna and the receiving array antenna partially overlap each other. Therefore, the uplink signal and downlink signal will still interfere with each other.

Although the current transceiver is expected to encapsulate the above-mentioned antennas in a housing of the same size to effectively reduce the size of the transceiver, the aforementioned problems cannot be solved.

SUMMARY

The disclosure provides an antenna-in-package construction with frequency division duplex technology. The antenna-in-package construction includes a chip layer, a second dielectric layer, and a first dielectric layer having the same or a different dielectric constant than the second dielectric layer that are stacked in order, and further includes a transmitting array antenna, a receiving array antenna, and a plurality of metal isolation pillars. The first dielectric layer has a dielectric constant that is more than 3.5. The transmitting antenna array extends from the chip layer to the first dielectric layer through the second dielectric layer. The receiving antenna array extends from the chip layer to the second dielectric layer, wherein the transmitting antenna array and the receiving antenna array are arranged in an alternating interleaved sequence. The plurality of metal isolated pillars surround each transmitting antenna and each receiving antenna. Additionally, the chip layer includes at least one transmitting chip and at least one receiving chip. The transmitting chip is electrically connected to the transmitting antenna array, and the receiving chip is electrically connected to the receiving antenna array. The transmitting array antenna includes a plurality of first antennas, and each first antenna is spaced a first distance from the adjacent first antenna, wherein the first distance is close to a half-wave length. The receiving array antenna includes a plurality of second antennas, and each second antenna is spaced a second distance from the adjacent second antenna, wherein the second distance is close to the half-wave length and is different from the first distance.

BRIEF DESCRIPTION OF THE DRAWINGS

The present invention can be more fully understood by reading the subsequent detailed description and examples with references made to the accompanying drawings, wherein.

DETAILED DESCRIPTION

This embodiment discloses an antenna-in-package construction 100, which measures 256×256 square millimeters ($mm^2$) and is applied to frequency division duplex (FDD) technology in wireless communication systems. The antenna-in-package construction 100 may be composed of a Complementary Metal Oxide Semiconductor (CMOS) chip and a 1024 array antenna, wherein the CMOS chip is manufactured by advanced processes. The wireless communication system may be consist of low-Earth orbit satellites and ground-based transceivers and employ frequency division duplex technology. Frequency division duplex technology involves simultaneous transmitting uplink signals with a first frequency band and receiving downlink signals with a second frequency band. Here, the first frequency band is the Ka-band, while the second frequency band ranges from the Ku-band to the K-band. The first frequency band and the second frequency band are different. The Ka-band frequency ranges from about 27 GHz to 40 GHz, with a wavelength ranges from about 11.11 mm to 7.50 mm. The Ku-band frequency ranges from about 12 GHz to 18 GHz, with a wavelength ranges from about 25.00 mm to 16.67 mm. The K-band frequency ranges from about 18 GHz to 27 GHz, with a wavelength ranges from about 16.67 mm to 11.11 mm.

Figure 1:
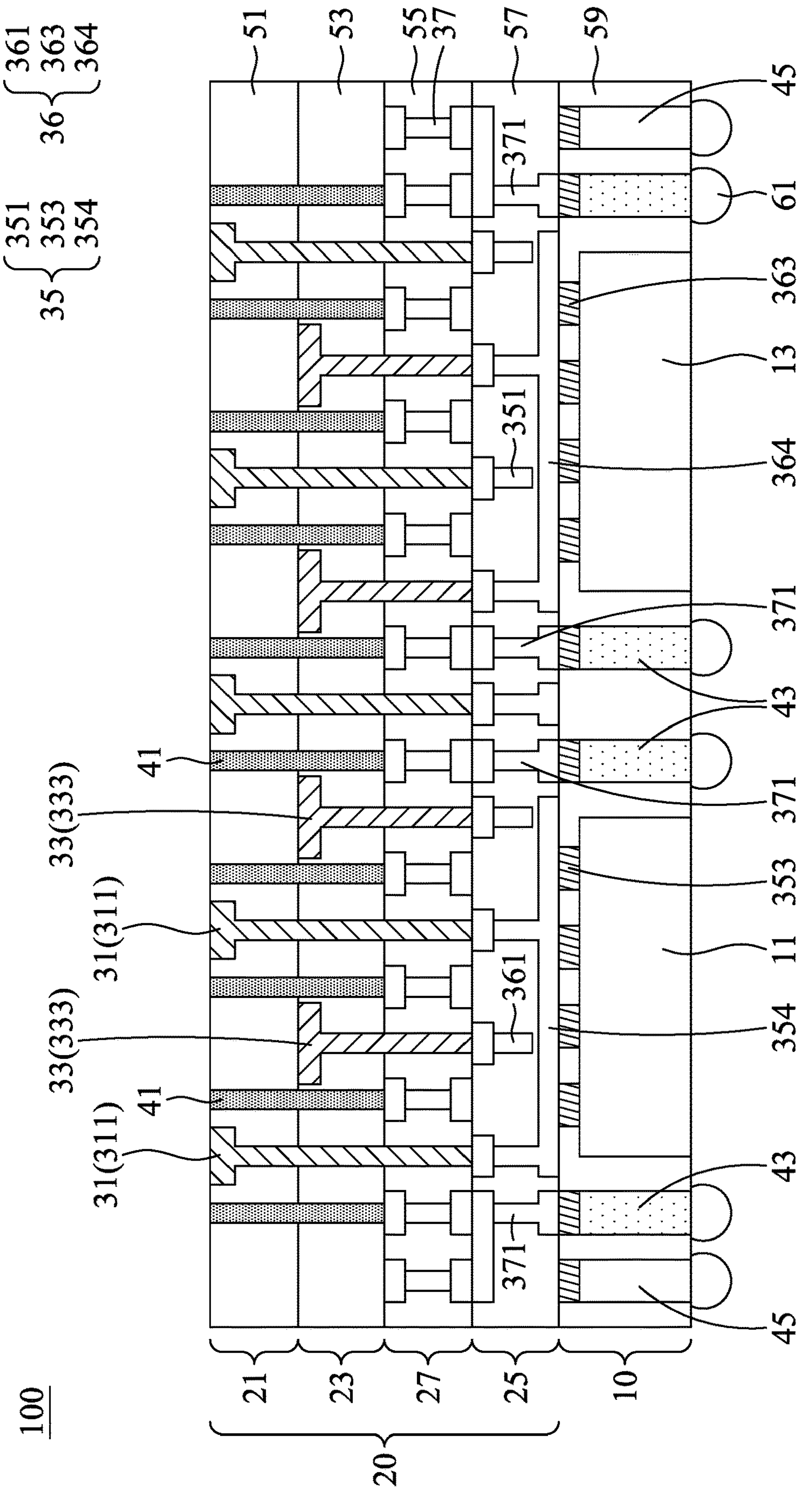
FIG. 1 is a partial side view illustrating an antenna-in-package construction according to an embodiment.

Referring to FIG. 1, the antenna-in-package construction 100 includes a chip layer 10 and a packaging stacked layer 20. The chip layer 10 includes one or more transmitting chips 11 and multiple receiving chips 13. The transmitting chip (TX chip) includes a power amplifier (PA). The receiving chip (RX chip) includes a low noise amplifier (LNA). The packaging stacked layer 20 includes a first dielectric layer 21, a second dielectric layer 23, a redistribution wiring layer 25, and a grounding layer 27. Moreover, as shown in FIG. 1, in this embodiment, the packaging stacked layer 20 further includes transmitting antenna arrays 31 and receiving antenna array 33 that are arranged in an alternating interleaved sequence, as well as multiple metal isolation pillars 41 and 43.

The chip layer 10 may further include one or more radio frequency front-end modules (FEM), one or more analog beamforming circuits, and one or more digital beamforming (DBF) circuits.

In this embodiment, both the transmitting chip 11 and receiving chip 13 may be made of silicon (Si), silicon germanium (SiGe), gallium nitride (GaN), gallium arsenide (GaAs), compound semiconductor, or any other suitable material. Optionally, the chip layer 10 may include an electromagnetic shielding layer.

The packaging stacked layer 20 may be a multi-layer board that is consisted of two or more layers and include low-temperature co-fired ceramic (LTCC), FR-4 epoxy glass fabric, RO high-frequency circuit board, silicon, glass, gallium arsenide, silicon nitride, thermal interface materials (TIM), any other suitable material, or a combination thereof. The thermal interface materials may include thermal grease, thermal gel, phase-change materials, phase-change metal alloys, thermally conductive adhesives, any other suitable material, or a combination thereof.

The first dielectric layer 21 is composed of a first dielectric material 51 and is disposed above the chip layer 10, wherein the first dielectric material 51 fills the spaces excluding the transmitting array antenna 31 and the metal isolation pillars 41. In this embodiment, the dielectric constant of the first dielectric material 51 is higher than the dielectric constant of air. For instance, the dielectric constant of the first dielectric material 51 may range from about 3 to 13, such as from about 3 to 4 (e.g., polyimide with a dielectric constant of about 3.5) or from about 10 to 13 (e.g., silicon with a dielectric constant of about 11.9 or gallium arsenide with a dielectric constant of about 12.9). The first dielectric material 51 may include any suitable dielectric material, such as low-temperature co-fired ceramic (LTCC), FR-4 epoxy glass fabric, RO high-frequency circuit board, silicon, glass, gallium arsenide, thermal interface materials (TIM), photosensitive materials (e.g., polyimide), any other suitable high dielectric constant material, or a combination thereof, but is not limited thereto.

The second dielectric layer 23 is composed of a second dielectric material 53 and is disposed between the chip layer 10 and the first dielectric layer 21. The second dielectric material 53 fills the spaces excluding the transmitting array antenna 31, receiving array antenna 33, and metal isolation pillars 41. In this embodiment, the second dielectric material 53 may be the same or similar to the first dielectric material 51, but the present disclosure is not limited thereto. In this embodiment, the dielectric constant of the second dielectric material 53 is less than that of the first dielectric material 51.

The redistribution wiring layer 25 is disposed between the chip layer 10 and the second dielectric layer 23 and includes a first antenna chip conductive wire 35 and a second antenna chip conductive wire 36. The first antenna chip conductive wire 35 includes (or is divided into) multiple conductive wires 351, 353, 354, and the conductive wires 351, 353, 354 electrically connect the transmitting array antenna 31 with the transmitting chip 11. The second antenna chip conductive wire 36 includes (or is divided into) multiple conductive wires 361, 363, 364, and the conductive wires 361, 363, 364 electrically connect the receiving array antenna 33 with the receiving chip 13. The conductive wires 351, 353, 354, 361, 363, 364 may include conductive materials, such as metals, metal silicides, similar materials, or a combination thereof.

The grounding layer 27 is disposed between the redistribution wiring layer 25 and the second dielectric layer 23. The grounding layer 27 includes multiple grounding pillars 37 that ground the metal isolation pillars 41. In addition, the redistribution wiring layer 25 also includes multiple grounding conductive wires 371. The grounding pillars 37 ground the metal isolation pillars 41 through the grounding conductive wires 371. The grounding pillars 37 and the grounding conductive wires 371 may include materials that are the same or similar to the conductive wires 351, 353, 354, 361, 363, and 364, which will not be repeated here, but the present disclosure is not limited thereto.

The transmitting array antenna 31 includes multiple first antennas 311 (also referred to as transmitting antennas) and extends from the first dielectric layer 21 to the chip layer 10 to be electrically connected to the transmitting chip 11. Furthermore, the distance between each first antenna 311 and the adjacent first antenna 311 is the first distance (Qu), which is close to a half-wave length.

The receiving array antenna 33 includes multiple second antennas 333 (also referred to as receiving antennas) and extends from the second dielectric layer 23 to the chip layer 10 to be electrically connected to the receiving chip 13. Furthermore, the distance between each second antenna 333 and the adjacent second antenna 333 is the second distance ($\lambda_D$), which is close to the half-wave length, wherein the second distance and the first distance may be the same or different. For example, the first distance is $0.528\lambda_U=0.528\times5.36=2.83008$ millimeters (mm), the second distance is $0.48\lambda_D=0.48\times8.33=3.9984$ millimeters (mm), and the ratio of the first distance to the second distance is 0.707.

In this embodiment, the transmitting array antenna 31 and the receiving array antenna 33 may include gold, tin, silver, copper, nickel, any other suitable metal or alloy. Moreover, the transmitting array antenna 31 and the receiving array antenna 33 may be formed by processes like electroplating, chemical plating, printing processes, other suitable processes or combinations thereof, but the present disclosure is not limited thereto.

In this embodiment, the number of transmitting array antennas 31 may be an integer multiple of the number of receiving array antennas 33, preferably twice as many. For example, there are 128 first antennas 311 in the transmitting array antenna 31, while there are 64 second antennas 333 in the receiving array antenna 33.

The metal isolation pillars 41 surround each first antenna 311 and each second antenna 333 to prevent the first antenna 311 and the second antenna 333 from interfering with each other. The metal isolation pillar 41 may include metals, such as gold (Au), nickel (Ni), platinum (Pt), palladium (Pd), iridium (Ir), titanium (Ti), chromium (Cr), tungsten (W), aluminum (Al), copper (Cu), tin (Sn), silver (Ag), a similar material, an alloy thereof, or a combination thereof. In this embodiment, the metal isolation pillars 41 are made of copper, but the present disclosure is not limited thereto.

The metal isolation pillars 43 surround the transmitting chip 11 and the receiving chip 12 to prevent the transmitting chip 11 and receiving chip 12 from interfering with each other. For example, the metal isolation pillar 43 may include materials that are the same as or similar or the metal isolation pillar 41, which will not be repeated here, but the present disclosure is not limited thereto.

Figure 2:
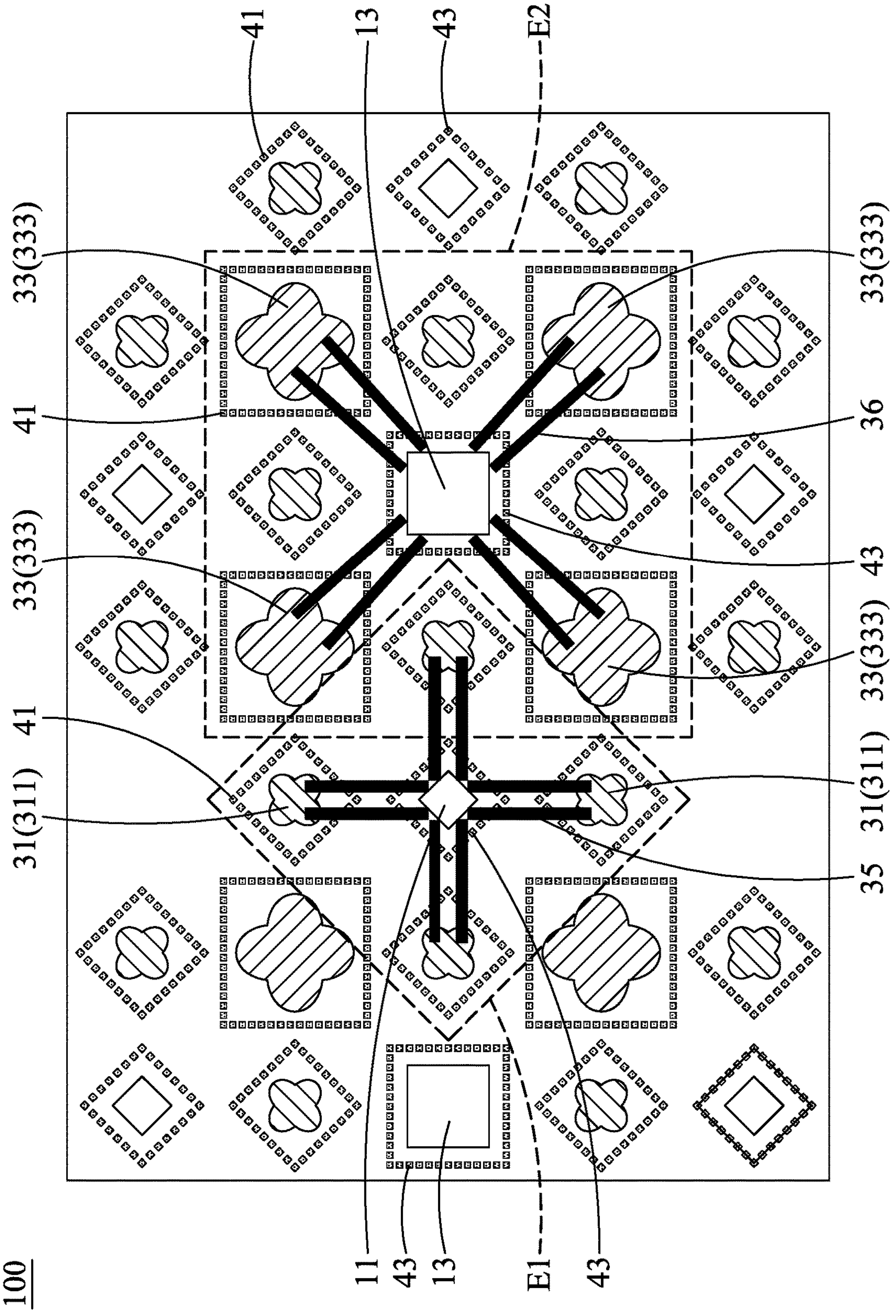
FIG. 2 is a partial bottom view illustrating an antenna-in-package construction according to an embodiment.

Referring to FIG. 1 and FIG. 2, in this embodiment, multiple first antennas 311 are arranged in one (or more) array(s), multiple second antennas 333 are arranged in one (or more) array(s), and the first antennas 311 and the second antennas 333 are arranged in an interleaved sequence. As shown in FIG. 1 and FIG. 2, in this embodiment, each transmitting chip 11 is electrically connected to four first antennas 311 (as shown in region E1 in FIG. 2), and each receiving chip 13 is electrically connected to four second antennas 333 (as shown in region E2 in FIG. 2), but the present disclosure is not limited thereto. In this embodiment, each transmitting chip 11 is electrically connected with two or more than four first antennas 311, and each receiving chip 13 is electrically connected with two or more than four second antennas 333. The arrangement and (electrical) connection of the transmitting array antenna 31 and receiving array antenna 33 may be designed or adjusted according to actual needs.

In the bottom view, after rotating each first antenna 311 by 45 degrees, each second antenna 333 has the same shape as each first antenna 311 but with different sizes. For instance, the top surfaces of both the first antenna 311 and the second antenna 333 are shaped like a clover. Furthermore, the top area of the first antenna 311 is smaller than the top area of the second antenna 333, but the present disclosure is not limited thereto.

Similarly, in the bottom view, the top surfaces of the first antenna 311 and the second antenna 333 may be rectangles, circles, ellipses, or other shapes, or the top area of the first antenna 311 may be equal to the top area of the second antenna 333. For example, each first antenna 311 is a rectangle, and each second antenna 333 is a diamond formed by rotating a rectangle, with the edge corner of the diamond that faces one side edge of the adjacent rectangle.

Similarly, in the bottom view, after rotating each receiving chip 13 by 45 degrees, each receiving chip 13 has the same shape as each transmitting chip 11 but with different sizes. For instance, the top surfaces of both the transmitting chip 11 and the receiving chip 13 are rectangular, and the top area of the transmitting chip 11 is smaller than the top area of the receiving chip 13, but the present disclosure is not limited thereto. In this embodiment, the top surfaces of the transmitting chip 11 and the receiving chip 13 may be other shapes, or the top area of the transmitting chip 11 may be equal to the top area of the receiving chip 13.

Similarly, the antenna-in-package construction 100 further includes dielectric layers 55 and 57. The dielectric layer 55 is disposed within the grounding layer 27 and fills the spaces excluding the transmitting array antenna 31, the receiving array antenna 33, and the grounding pillars 37. The dielectric layer 57 is disposed within the redistribution wiring layer 25 and fills the spaces excluding the conducting wires 351, 353, 354, 361, 363, 364, and the grounding conductive wire 371, but the present disclosure is not limited thereto.

In this embodiment, the transmitting array antenna 31 operates in the first frequency band, while the receiving array antenna 33 operates in the second frequency band. The first frequency band is determined by the top area of the first antenna 311 and the dielectric constant of the dielectric layer 51, whereas the second frequency band is determined by the top area of the second antenna 333 and the dielectric constant of the dielectric layer 53.

In this embodiment, the antenna-in-package construction 100 further includes conductive pillars 45 disposed within the chip layer 10 for electrically connecting other conductive components in the chip layer 10 (e.g., other chips, conductive pads, etc.) to external or internal components of the antenna-in-package construction 100.

In this embodiment, the antenna-in-package construction 100 includes a protective material 59 disposed within the chip layer 10 and fills the space excluding the transmitting chip 11, the receiving chip 13, the metal isolation pillars 43, and the conductive pillars 45, but the present disclosure is not limited thereto. The protective material 59 may include molding compounds, mold underfill (MUF), other suitable materials, or a combination thereof, but the present disclosure is not limited thereto.

Figure 3:
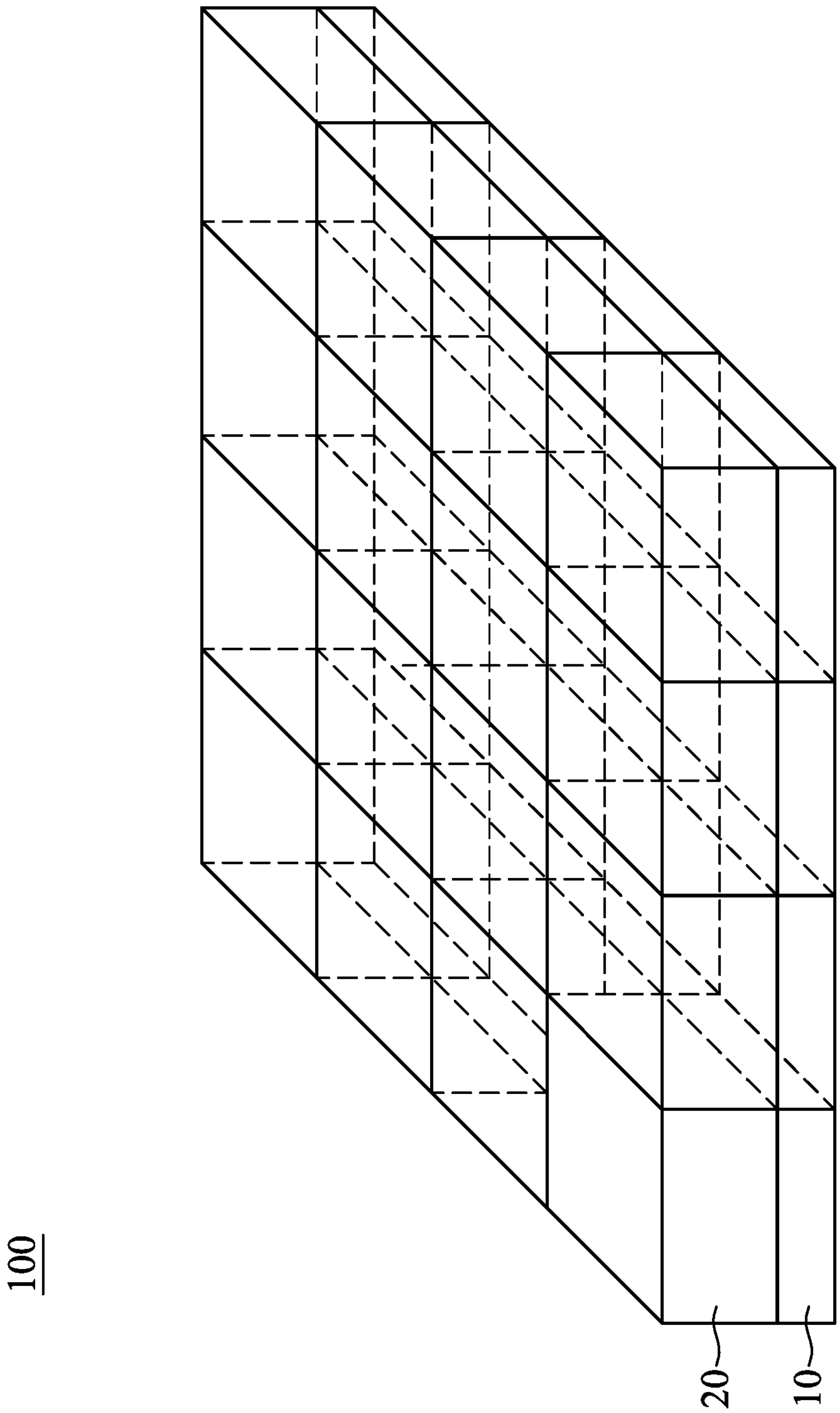
FIG. 3 is a schematic three-dimensional view illustrating an antenna-in-package construction according to an embodiment.

Referring to FIG. 3, multiple packaging stacked layers 20 are respectively disposed above the corresponding chip layer 10. Here, each packaging stacked layer 20 may include at least one region E1 (i.e., a transmitting chip 11 is electrically connected to four first antennas 311) and region E2 (i.e., a receiving chip 13 is electrically connected to four second antennas 333). In other words, in FIG. 3, the antenna-in-package construction 100 may include sixteen transmitting chips 11 with their corresponding sixty-four first antennas 311, and sixteen receiving chips 13 with their corresponding sixty-four second antennas 333, but the present disclosure is not limited thereto.

Referring again to FIG. 3, regarding the manufacturing method of the antenna-in-package construction 100, the panel-level package (PLP) process may be adopted, which uses large-area substrates to enhance the production of massive planar antenna arrays.

In this embodiment, the interleaved array of the antenna-in-package construction 100 may support multi-band receiving/transmitting antenna arrays. It may perform frequency division duplexing (FDD) communication processing in the mobile devices of wireless communication systems, integrating both the transmitting antenna (TX) and the receiving antenna (RX) into a single module for miniaturization, thereby replacing the traditional two sets of non-shared antenna structures. Furthermore, according to the embodiment, the antenna-in-package construction 100 may overcome issues such as mutual interference between the transmitting antenna (TX) and the receiving antenna (RX), point error of the antenna beam, and grating lobes caused by the gap between the uplink and downlink carrier frequencies in the Ka-band.

Figure 4:
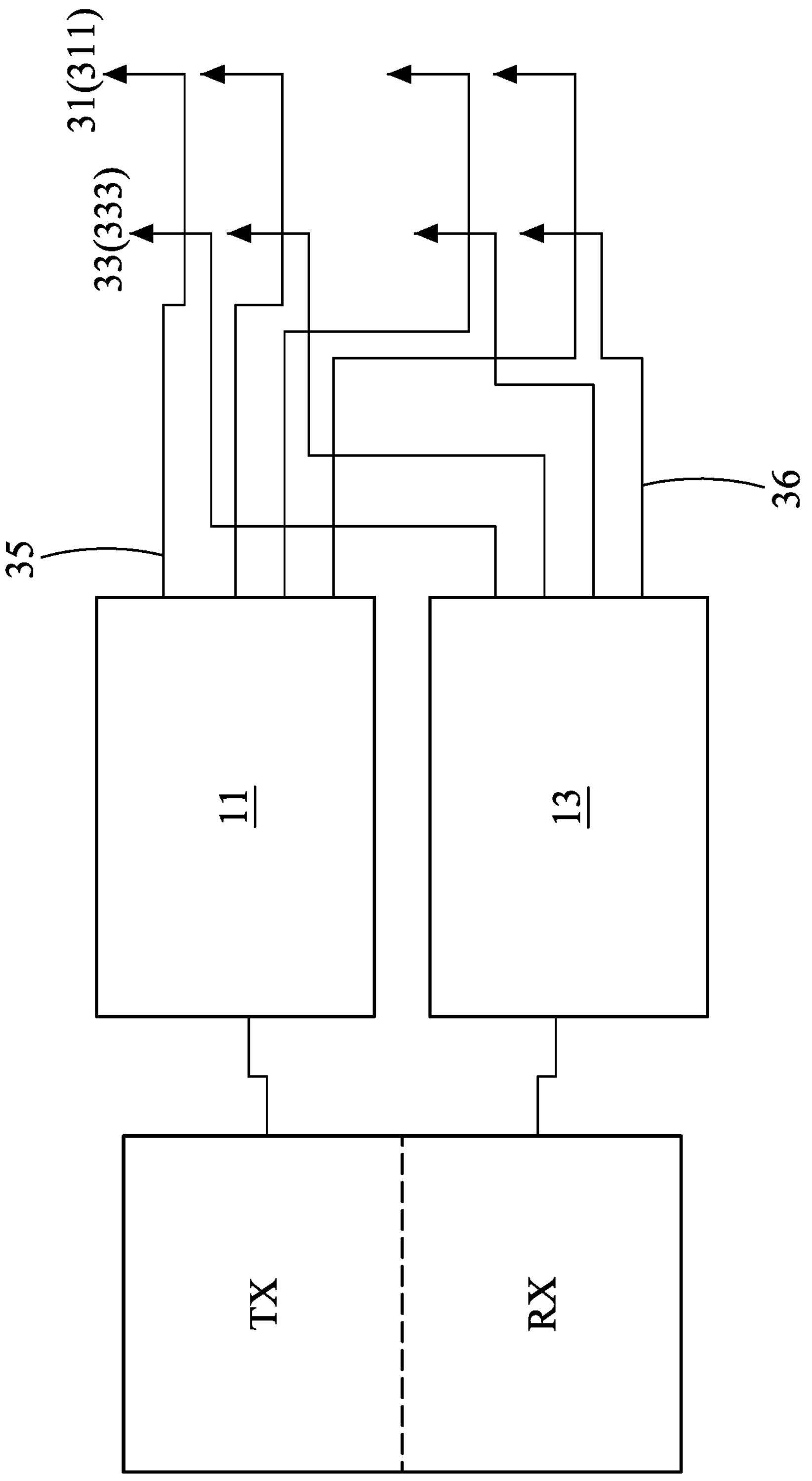
FIG. 4 is a diagram illustrating a method for performing wireless communication according to an embodiment.

Referring to FIG. 4, through the antenna-in-package construction 100, frequency division duplexing is implemented. The transmission signal TX emitted by the transmitting chip 11 is transmitted to the transmitting array antenna 31 through the first antenna chip conductive wire 35 and emitted outside the antenna-in-package construction 100. At the same time, the reception signal RX received by the receiving array antenna 33 is transmitted to the receiving chip 33 for signal processing through the second antenna chip conductive wire 36. In this embodiment, the transmitting array antenna 31 operates at the first frequency band, the receiving array antenna 33 operates at the second frequency band, and the first frequency band and the second frequency band are different.

Unlike time division duplexing (TDD), frequency division duplexing uses two frequency channels to transmit and receive signals. Because the operation time is continuous, during high-speed movement (e.g., on a high-speed train or receiving signals from low-Earth orbit satellites), the resource allocation of frequency division duplexing is large. Electronic devices (e.g., mobile phones) that include the antenna-in-package construction 100 transmit (uplink) and receive (downlink) simultaneously. If the electronic device detects a deterioration in the quality of the receiving channel (downlink), it can quickly inform the base station (e.g., a cellular base station or low-Earth orbit satellite) for adjustments through the transmitting channel (uplink).

Referring to FIG. 5A to FIG. 5D, the internal structure of the antenna-in-package construction 100 is shown in a partially transparent manner. In other words, when observing the side of the antenna-in-package construction 100 in reality, it may not be possible to see every component shown in FIG. 5A to FIG. 5D. Moreover, some components of the antenna-in-package construction 100 are omitted in FIG. 5A to FIG. 5D for the sake of brevity.

Figure 5A:
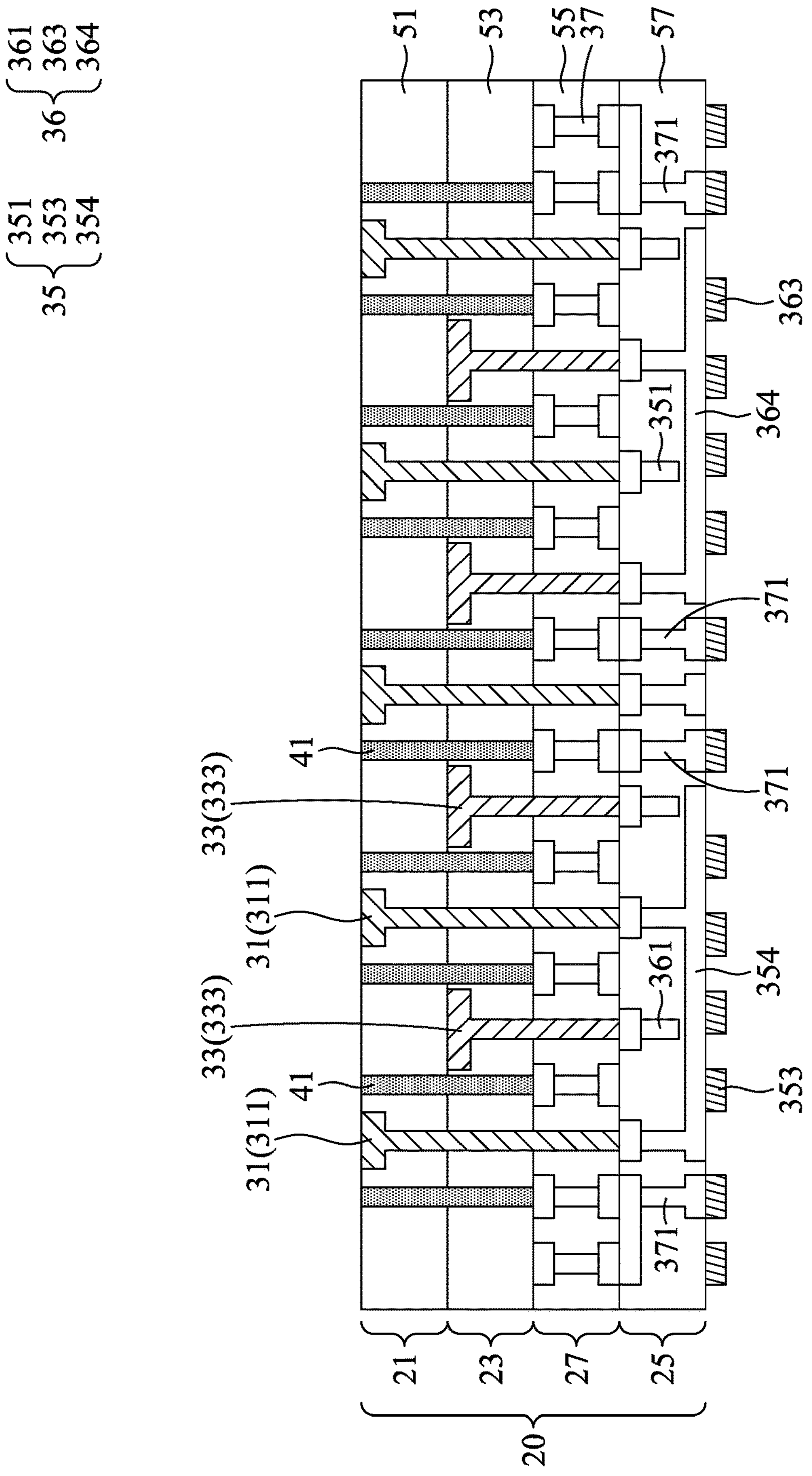
FIG. 5A to FIG. 5D are partial side views of manufacturing the antenna-in-package construction at various stages according to an embodiment.

Referring to FIG. 5A, a method for manufacturing the packaging stacked layer 20 is provided. The packaging stacked layer 20 sequentially includes a redistribution wiring layer 25, a grounding layer 27, a second dielectric layer 23, and a first dielectric layer 21. The transmitting array antenna 31 (that includes multiple first antennas 311) is disposed in the first dielectric layer 21 and extends from the first dielectric layer 21 to the redistribution wiring layer 25. The receiving array antenna 33 (that includes multiple second antennas 333) is disposed in the second dielectric layer 23 and extends from the second dielectric layer 23 to the redistribution wiring layer 25. Multiple metal isolation pillars 41 surround each first antenna 311 and each second antenna 333 to prevent the transmitting array antenna 31 and the receiving array antenna 33 from interfering with each other.

Figure 5B:
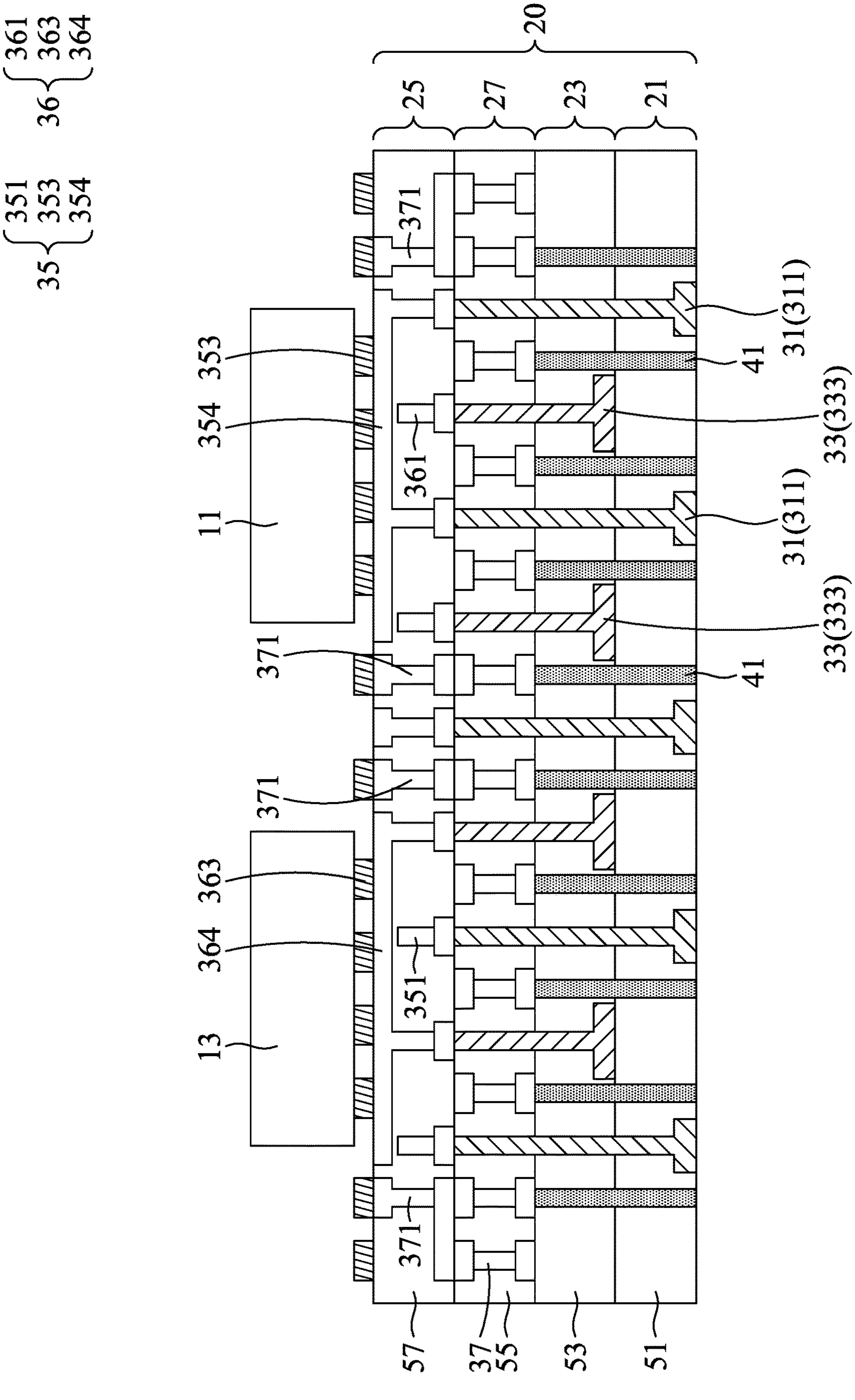

Referring to FIG. 5B, the packaging stacked layer 20 is inverted, and multiple transmitting chips 11 and multiple receiving chips 13 are formed on the redistribution wiring layer 25 (only one transmitting chip 11 and one receiving chip 13 are illustrated in FIG. 5B). The transmitting chips 11 are electrically connected to the transmitting array antenna 31, and the receiving chips 13 are electrically connected to the receiving array antenna 33.

Figure 5C:
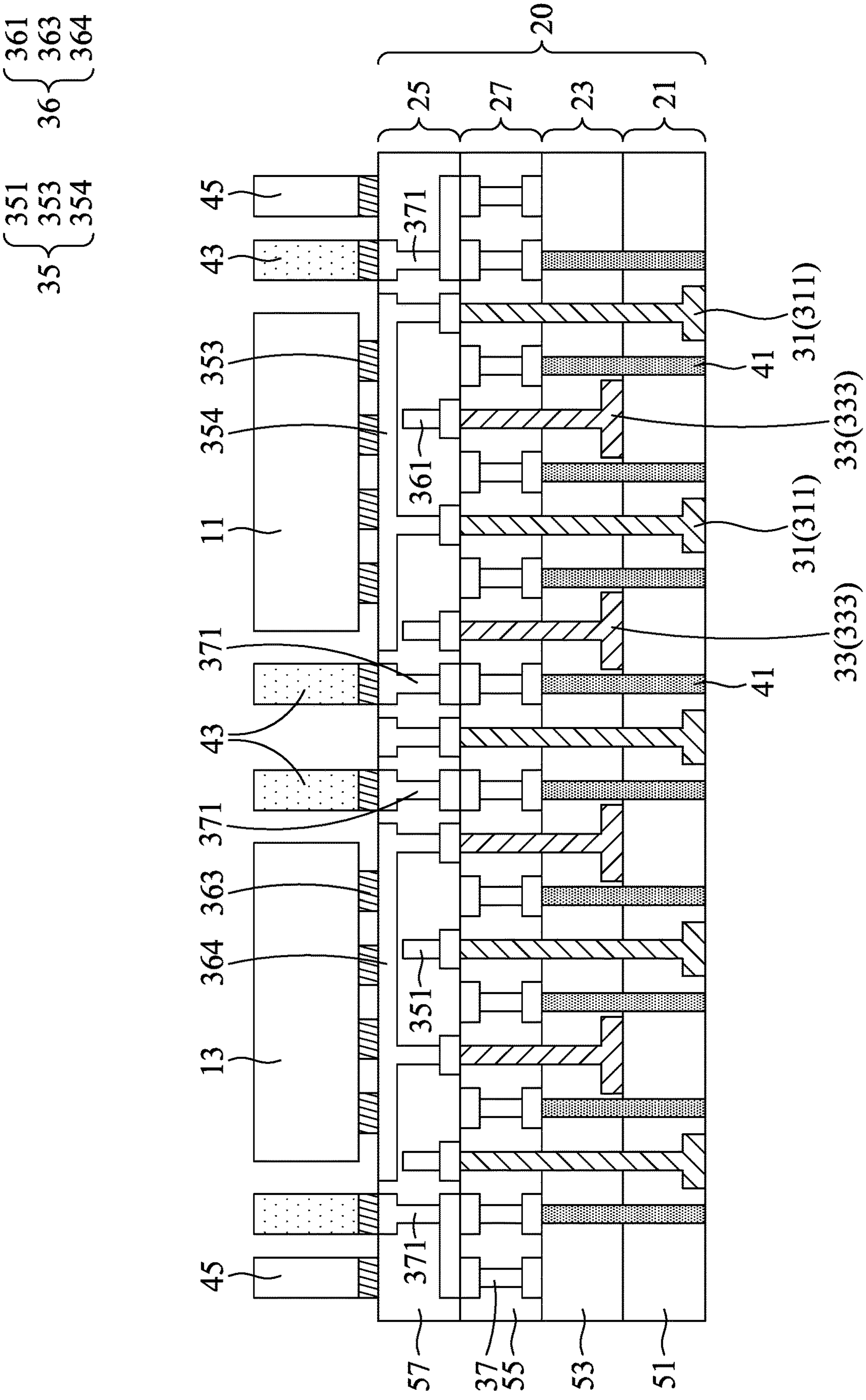

Referring to FIG. 5C, metal isolation pillars 43 are formed around the transmitting chips 11 and the receiving chips 12 to prevent the transmitting chips 11 and the receiving chips 12 from interfering with each other. In this embodiment, when forming the metal isolation pillars 43, conductive pillars 45 are also formed, but the present disclosure is not limited thereto.

Figure 5D:
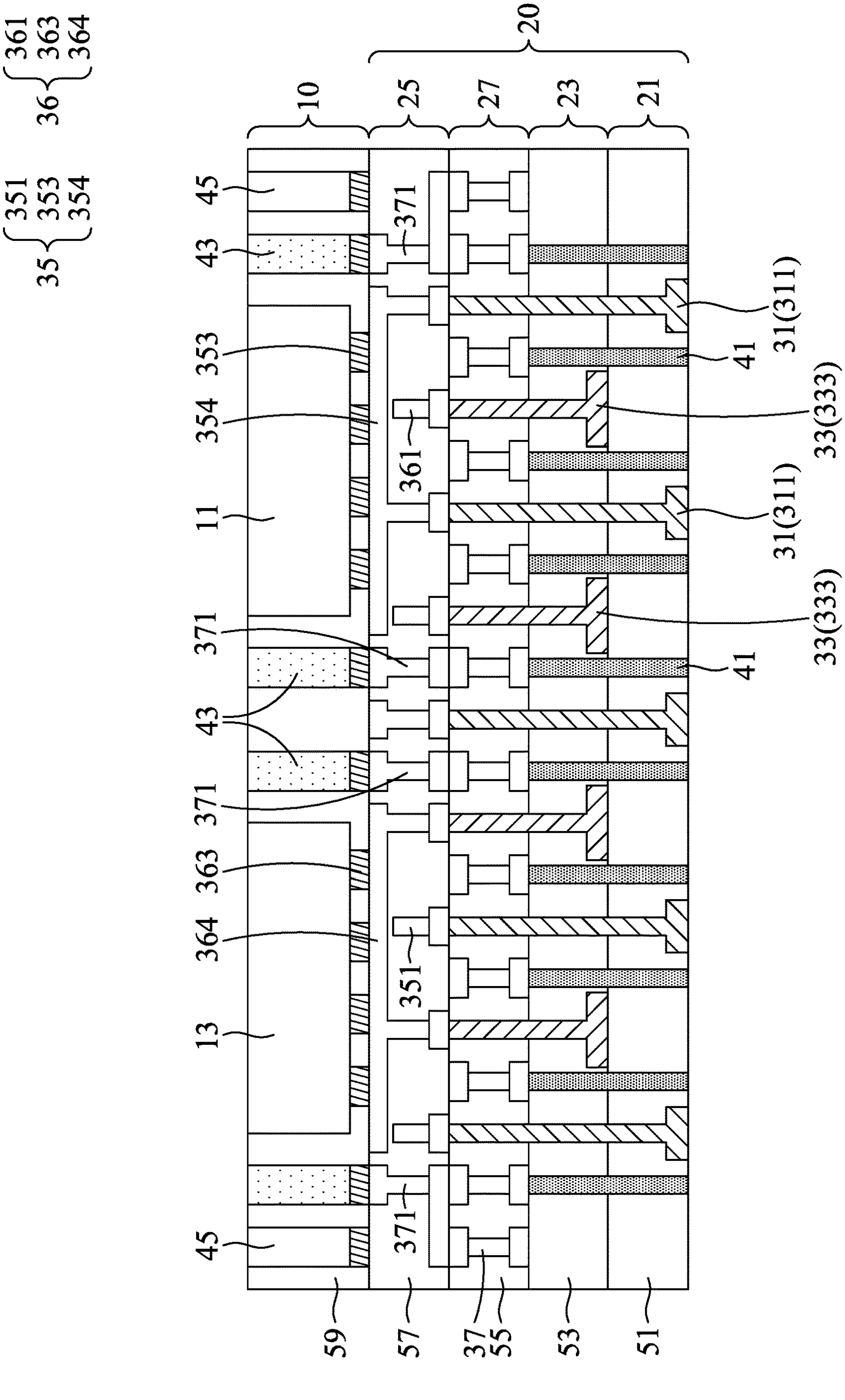

Referring to FIG. 5D, a protective material 59 is formed on the redistribution wiring layer 25. In more detail, the protective material 59 is formed between the transmitting chips 11, the receiving chips 13, the metal isolation pillars 43, and the conductive pillars 45, exposing (at least part of) the surface of the transmitting chips 11, the receiving chips 13, the metal isolation pillars 43, and the conductive pillars 45.

Then, referring back to FIG. 1, multiple solder balls 61 are formed and connected to the metal isolation pillars 43 and the conductive pillars 45 to form the antenna-in-package construction 100. More specifically, each metal isolation pillar 43 and each conductive pillar 45 are in direct contact with the corresponding solder ball 61. Finally, the antenna-in-package construction 100 may be electrically connected to another conductive substrate (not shown) through the solder balls 61, which is a type of flip-chip bonding, but the present disclosure is not limited thereto. In this embodiment, the antenna-in-package construction 100 may also be electrically connected to another conductive substrate using wire bonding.

In summary, according to the embodiment, the antenna-in-package construction may be arranged in an interleaved pattern between the transmitting array antenna and the receiving array antenna, approximating the aforementioned optimal space and optimal ratio to avoid interference between the uplink and downlink signals. Additionally, the antenna-in-package construction may also reduce issues such as the point errors of the antenna beam and grating lobes.

What is claimed is:

1. An antenna-in-package construction with transmit an uplink signal and receive a downlink signal that have different frequency bands, comprising:

a chip layer comprising at least one transmitting chip and at least one receiving chip;

a first dielectric layer on the chip layer, wherein the first dielectric has a dielectric constant that is higher than 3.5;

a second dielectric layer between the chip layer and the first dielectric layer;

a transmitting array antenna comprising a plurality of first antennas, electrically connected to the transmitting chip and extending from the transmitting chip to the first dielectric layer, wherein each of the first antennas is spaced a first distance from an adjacent one of the first antennas, and the first distance is close to a half-wave length;

a receiving array antenna comprising a plurality of second antennas, electrically connected to the receiving chip and extending from the receiving chip to the second dielectric layer, wherein each of the second antennas and each of the first antennas are arranged in a staggered manner on a same plane, and each of the second antennas is spaced a second distance from an adjacent one of the second antennas, and the second distance is close to the half-wave length and is different from the first distance; and a plurality of metal isolation pillars surrounding each of the first antennas and each of the second antennas.

2. The antenna-in-package construction as claimed in claim 1, wherein the transmitting array antenna is used to transmit the uplink signal, and the receiving array antenna is used to receive the downlink signal.

3. The antenna-in-package construction as claimed in claim 2, wherein the uplink signal has a first frequency band ranging from 27 GHz to 40 GHz, and the downlink signal has a second frequency band ranging from 17 GHz to 27 GHz.

4. The antenna-in-package construction as claimed in claim 1, wherein the first distance is less than the second distance.

5. The antenna-in-package construction as claimed in claim 1, wherein on the same plane, an area of each of the first antennas is different from an area of each of the second antennas.

6. The antenna-in-package construction as claimed in claim 5, wherein on the same plane, the area of each of the first antennas is smaller than the area of each of the second antennas.

7. The antenna-in-package construction as claimed in claim 1, wherein on the same plane, a length of each of the first antennas is longer than a length of each of the second antennas.

8. The antenna-in-package construction as claimed in claim 1, wherein each of the first antennas comprises at least one side edge, and each of the second antennas includes at least one edge corner, wherein the edge corner of the second antenna faces the side edge of an adjacent one of the first antennas.

9. The antenna-in-package construction as claimed in claim 1, wherein on the same plane, each of the first antennas and each of the second antennas have the same shape.

10. The antenna-in-package construction as claimed in claim 1, wherein on the same plane, each of the first antennas and each of the second antennas have different shapes.

11. The antenna-in-package construction as claimed in claim 1, wherein on the same plane, an area of each of the first antennas is the same as an area of each of the second antennas.

12. The antenna-in-package construction as claimed in claim 1, wherein the number of transmitting array antennas and the number of receiving array antennas are the same.

13. The antenna-in-package construction as claimed in claim 1, wherein the number of transmitting array antennas and the number of receiving array antennas are different.

14. The antenna-in-package construction as claimed in claim 1, wherein the number of transmitting array antennas is an integer multiple of the number of receiving array antennas.

15. The antenna-in-package construction as claimed in claim 1, wherein a dielectric constant of the second dielectric layer is different from a dielectric constant of the first dielectric layer.

16. The antenna-in-package construction as claimed in claim 1, wherein the dielectric constant of the second dielectric layer is the same as the dielectric constant of the first dielectric layer.

17. The antenna-in-package construction as claimed in claim 1, further comprising:

a redistribution wiring layer comprising a plurality of conductive lines and disposed between the chip layer and the second dielectric layer, wherein the redistribution wiring layer is used for electrically connecting each of the first antennas to the transmitting chip and electrically connecting each of the second antennas to the receiving chip.

18. The antenna-in-package construction as claimed in claim 1, wherein the metal isolation pillars are also around the transmitting chip and the receiving chip.

19. The antenna-in-package construction as claimed in claim 1, further comprising:

a grounding layer comprising a plurality of grounding pillars, wherein the grounding layer is used for grounding the metal isolation pillars.

20. The antenna-in-package construction as claimed in claim 1, wherein each of the first antennas extends from the transmitting chip to the second dielectric layer instead of the first dielectric layer; and each of the second antennas extends from the receiving chip to the first dielectric layer instead of the second dielectric layer.

* * * * *